United States Patent [19]
Ohtsu

[11] 3,902,233
[45] Sept. 2, 1975

[54] ROLL ASSEMBLY
[75] Inventor: Yaswo Ohtsu, Amagasaki, Japan
[73] Assignee: Sumitomo Electric Industries, Ltd., Osaka, Japan
[22] Filed: Apr. 19, 1974
[21] Appl. No.: 462,521

[30] Foreign Application Priority Data
Apr. 23, 1973 Japan.............................. 48-45098

[52] U.S. Cl........................................ 29/125; 29/125
[51] Int. Cl.²........................................... B21B 31/08
[58] Field of Search....................... 29/125, 132, 123

[56] References Cited
UNITED STATES PATENTS

| | | | |
|---|---|---|---|
| 2,342,159 | 2/1944 | Moran | 29/125 |
| 3,432,902 | 3/1969 | Rackoff et al. | 29/125 |
| 3,461,527 | 8/1969 | Strandell | 29/132 X |
| 3,787,942 | 1/1974 | Bindernagel et al. | 29/125 |
| 3,803,683 | 4/1974 | Oxlade | 29/125 |

*Primary Examiner*—Alfred R. Guest
*Attorney, Agent, or Firm*—Kurt Kelman

[57] ABSTRACT

In a roll assembly comprising a roll body and a ring made of hard material mounted securely on the barrel surface of said roll body by suitable tightening means, at least one of the lateral surfaces of the hard ring is formed in an outer-conical surface to which a clamp ring having a corresponding inner-conical surface is abutted thereon. The inside diameter of the clamp ring is substantially greater than the outside diameter of the roll body at the corresponding portion. The roll ring is pre-tightened by said suitable means together with the clamp ring which is pre-heated to a suitable temperature. The thermal contraction after cooling elicits principal tightening force.

5 Claims, 8 Drawing Figures

ROLL ASSEMBLY

BACKGROUND OF THE INVENTION

The present invention relates generally to a roll assembly particularly of the type having a ring of hard material, for example, super hard alloy such as cemented tungsten carbide, so that the outer peripheral surface thereof may serve as a rolling barrel.

In a roll for metal rolling it is desired to build the rolling surface with hard materials so as to increase the rolling speed and to extend the life of the roll. However, due to the expensiveness and inherent brittleness of super hard alloys it is not always suitable to build a roll integrally with the hard alloys.

For this reason, there has heretofore been used the roll assembly taught, for instance, by U.S. Pat. No. 3,435,499 or a roll assembly as shown in FIG. 1 wherein a hard ring 12 of hard alloy having a tapered inner peripheral surface 13 and a roll body 10 having a tapered outer peripheral surface 11 are fitted with each other on their respective tapered surfaces and secured with each other by tightening a nut 15 with thread 14 which engages with outer thread of the roll body 10.

This prior art of roll assembly, however, has certain disadvantages such that a hoop stress tends to occur in the hard ring in a tangential direction to the circumference of the ring to cause a crack in a radial direction (a radial cracking) and that, when rolling is carried out locally on the barrel, a crack tends to occur at the center of the rolling area along through a plane perpendicular to the roll body (a perpendicular cracking).

In an attempt to obviate these disadvantages, accordingly, there has been proposed an improved roll assembly as shown in FIG. 2 wherein the contact surfaces of the nut 25 and the hard ring 22 of the roll 2 are formed respectively in conical surfaces 25a and 22a (so that the side surface of the hard ring is an outer-conical surface) whereby a component of tightening force of the nut 25 threaded on the screw 24 of the roll body is directed to serve as a pressure to compress the hard ring 22 radially. However, the aimed effect will be achieved only very little unless a great lateral pressure is activated.

Accordingly, it has been proposed to give a substantial temperature difference between the hard ring and the roll body before tightening to obtain a great lateral pressure. (This idea seems to be applicable if, for instance, forming the hard ring with cemented carbide and roll body with steel because the coefficient of thermal expansion of the former is about a half that of the latter.) At this time, however, inevitably there also occurs a radial expansion difference between the external diameter of the roll body and the internal diameter of the hard ring, which tends to cause a radial cracking in the hard ring just upon tightening of the nut. In order to avoid this breakage, a clearance must be provided beforehand between the engaging surfaces of the hard roll and the roll body, which, however, will increase the possibility of cracking due to the rolling load because of the existence of nonsupported portion of the hard ring by roll body. Since from the technical problems described above, the improved rolling assembly shown in FIG. 2 has been seldom put into practical service yet.

Accordingly, the primary object of the present invention is to obviate the disadvantages of heretofore existing roll assembly and more particularly to provide a new and improved roll assembly preventing radial or perpendicular cracking in the hard ring.

Another object of the present invention is to provide a new and improved roll assembly in which the hard ring is securable on the roll body with a strong tightening force.

SUMMARY OF THE INVENTION

A characteristic feature of the present invention is that a lateral surface of the hard ring is formed as an outer surface of a cone, adjacent said conical lateral surface is provided a clamp ring having a lateral surface formed as an inner surface of a cone corresponding to the conical lateral surface of the adjacent hard ring and also having an inside diameter dimensioned larger than the outside diameter of the roll body corresponding thereto so that to form an annular gap between the inner face of the hard ring and the outer face of the roll body.

BRIEF DESCRIPTION OF THE DRAWINGS

The invention will be better understood from the following description taken in connection with the accompanying drawings, in which.

DESCRIPTION OF THE PREFERRED EMBODIMENTS

Figure 1:
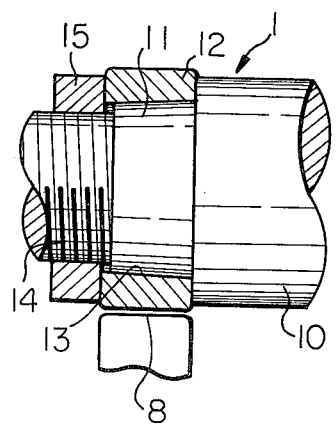
FIG. 1 is a side sectional view of an example of a prior roll assembly.
Figure 2:
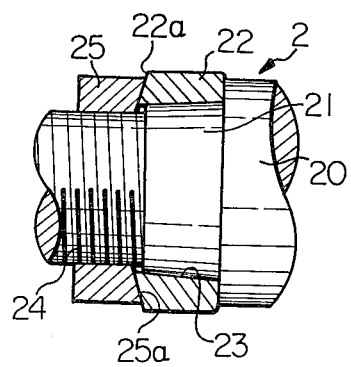
FIG. 2 is a longitudinal sectional view of another example of the prior roll assembly.

Referring now to the drawings, embodiments of the present invention will be described.

Figure 3:
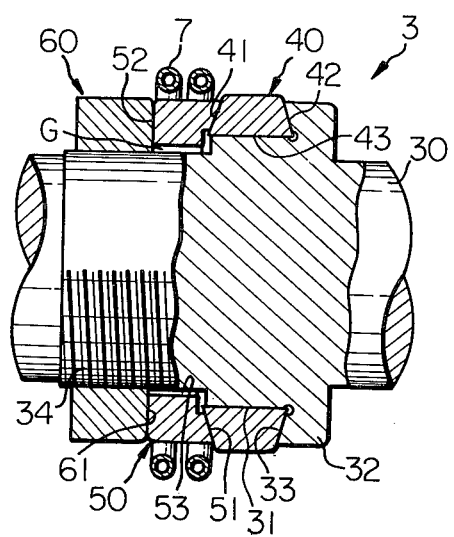
FIG. 3 is a longitudinal sectional view of an embodiment of a roll assembly according to the present invention.
Figure 4:
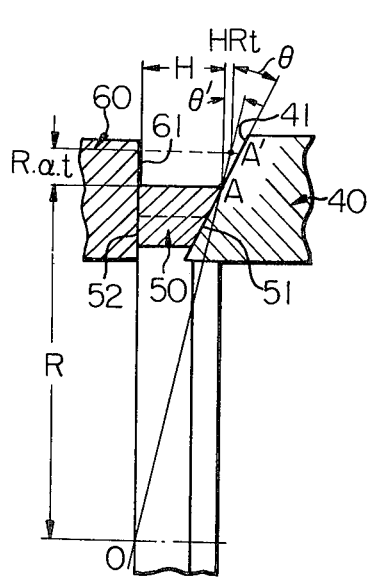
FIG. 4 is a drawing to show the thermal expansion of a clamp ring in the roll assembly of FIG. 3.
Figure 5:
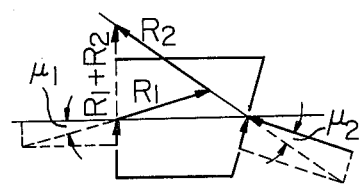
FIG. 5 is a diagram showing the forces exerted on the clamp ring in the roll assembly of FIG. 3.

FIGs. 3 to 5 show an embodiment of the roll assembly 3 according to the present invention, comprising a roll body 30, a hard sleeve or ring 40, a clamp ring 50, and tightening means such as a nut 60.

The roll body 30 is formed thereon with a cylindrical outer surface 31 around which is fitted the hard ring, a flange 32 having a conical lateral surface 33 on one side namely on the side of the cylindrical outer surface 31, and a screw 34. The hard sleeve or ring 40 is formed thereon with a pair of convex conical lateral surfaces 41 and 42. The outside diameter of the outer peripheral surface 31 of the roll body 30 is substantially identical with the inside diameter of the hard ring, and the conical lateral surface 33 formed on the flange has the same inclination with the conical lateral surface 42 of the hard ring so that they are in close contact with each other when the hard ring 40 is inserted into the roll body 30 as shown in FIG. 4. Between the inner peripheral surface 43 of the hard ring 40 and the outer peripheral surface 31 of the roll body, prior to assembly, there is no or only a very small, if any, gap. However, after they are assembled together according to the method described hereinafter, the gap is eliminated by the deformation of the hard ring due to elastic compression.

On the roll body 30 is further mounted with the hard ring therebetween a clamp ring 50 having a conical lateral surface 51 corresponding to the conical lateral surface 42 of the hard ring and a lateral plain surface 52 which is at right angles to the axis of the roll body.

Also assembled is a nut 60, which has a lateral surface 61 corresponding to the plain surface 52 of the clamp ring and is pressed against the hard ring by means of tightening means, namely an internal thread of the nut into the screw 34 of the roll body.

The inside diameter of the clamp ring is substantially larger than the outside diameter of the screw portion 34 of the roll body so that there is formed a sufficient gap G between the inner surface 53 of the clamp ring 50 and the outer surface of the roll body even when the ring 50 contracts after assembly.

In assembling the roll assembly 3, the hard ring 40 and the clamp ring 50 are first tightened temporarily by the nut 60 so as not to move during assembly. At this time, due to the centripetal shapes of outer or inner conical surfaces of relating parts the hard ring can be disposed coaxially with the roll body. In this condition, only the clamp ring is heated by means of a high frequency electric induction coil 7 provided around the clamp ring. When the temperature of the clamp ring reached a desired level, the electric current is switched off and the nut 60 is further tightened. After, while the clamp ring 50 tends to contract to the size at room temperature, it is prevented from contracting freely by the nut which was tightened while in high temperature. As a result, the clamp ring, acting as a wedge to tighten the matter from all radial directions, compresses the hard ring 40 axially and radially while at the same time the clamp ring is, under the reaction force from the hard ring, compressed axially and expanded radially.

FIG. 5 shows the equibalance of forces exerted in the hard ring 40 and the clamp ring 50 of this embodiment. In this Figure, the pressing force through the conical surface (the reaction force of $R_2$) acts as the tightening force of the hard ring from the side of the left-hand conical surface. $R_1$ denotes a pressing force transmitted from the lateral surface of the nut. Since the resultant force of $R_1$ and $R_2$ becomes zero in the axial direction, only the component thereof in the radial direction $R_1+R_2$ remains effective. This radial component is to be balanced by the tensile hoop stress in the radial section of the clamp ring. In FIG. 5, $\mu_1$ and $\mu_2$ indicate friction angles of the left and right lateral surfaces respectively of the clamp ring.

If the inclination angles of the conical lateral surfaces of the hard ring 40 and clamp ring 50 are predetermined properly, the nut which is temporarily tightened will become loosened for the reason to be described below when the clamp ring is heated.

In FIG. 4, providing that a point A on the outside diameter surface on the conical lateral surface of the clamp ring 50 transfers to the point A' due to thermal expansion cheating temperature difference: $t$) and the radial lateral surface 52 is made to lie along the lateral plain surface 61 of the nut, then:

Radial displacement due to the thermal expansion = $R \cdot \alpha \cdot t$
Axial displacement due to the thermal expansion = $H \cdot \alpha \cdot t$ wherein
R: Outer diameter of the clamp ring at room temperature
$\alpha$: Coefficient of thermal expansion of the clamp ring material
H: Width of the clamp ring As a consequence, the angle $\theta'$ showing the direction of displacement of the point A is expressed by:

$$\tan \theta' = H/R$$

Accordingly, if the angle $\theta$ of the conical lateral surface is predetermined so as to satisfy the following formula:

$$\tan \theta > \tan \theta' = H/R$$

then, the point A' will be separated from the lateral surface of the hard ring making it possible to tighten the nut 60 by the amount.

Figure 6:
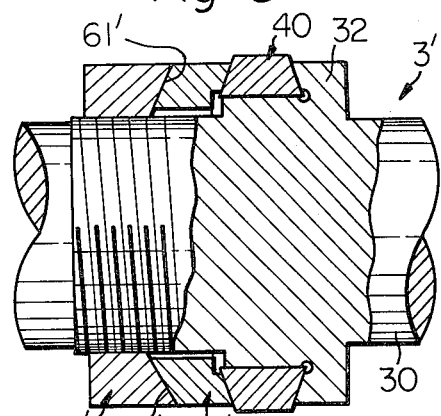
FIG. 6 is a longitudinal sectional view of another embodiment of the roll assembly according to the present invention.

FIg. 6 shows another embodiment of the roll assembly according to the present invention. The roll assembly 3' according to this embodiment is identical in construction with the roll assembly 3 shown in FIG. 3 except that the former has an improved abutting plane between the clamp ring and the nut. Accordingly, to avoid needless repetition, detailed description of the corresponding parts of the two embodiments will be omitted.

In the roll assembly 3' according to this embodiment, the engaging surface between the clamp ring 50' and the nut 60' are formed not by plain surfaces perpendicular to the axis of the roll body but by inclined surfaces 52' and 61' opposite to each other. The inclined surface 52' of the clamp ring 50' is inclined in the same direction as the inclined surface 51' which is in contact with the hard ring.

Figure 7:
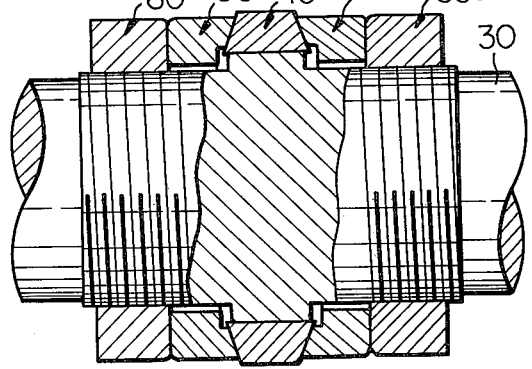
FIG. 7 is a longitudinal sectional view of still another embodiment of the roll assembly according to the present invention.

FIG. 7 shows still another embodiment of the roll assembly according to the present invention. In the roll assembly 3'' of this embodiment, on both sides of the hard sleeve or ring 40 are disposed clamp rings 50 and 50a each same as the contraction ring shown in FIG. 3 and pressed axially against the hard ring 40 by means of nuts 60 and 60a, respectively. Since the function of these clamp rings is same as that of the clamp ring shown in FIG. 3, description thereof is omitted.

In the roll assembly having the construction shown in FIG. 7, instead of providing two fastening means or nuts, one of the nuts 60 or 60a may be formed as a flange integral with the roll body.

While their embodiments are shown as having both lateral surfaces of the hard ring formed respectively as portions of conical surfaces, hard ring may be formed as having one, formed in a plain surface perpendicular to the axis of the roll body and only the other, formed in a conical surface.

Figure 8:
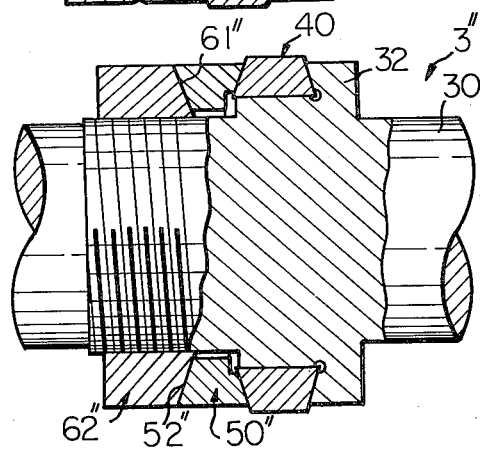
FIG. 8 is a longitudinal sectional view of another embodiment of the roll assembly according to the present invention.

FIG. 8 shows another embodiment of the roll assembly according to the present invention. The roll assembly 3'' according to this embodiment is identical in construction with the roll assembly 3 shown in FIG. 3 except that the former has an improved abutting plane between the clamp ring and the nut. Accordingly, to avoid needless repetition, detailed description of the corresponding parts of the two embodiments will be omitted.

In the roll assembly 3'' according to this embodiment, the engaging surfaces between the clamp ring 50'' and the nut 60'' are formed not by plain surfaces perpendicular to the axis of the roll body but by inclined surfaces 52'' and 61'' opposite to each other, which are substantially symmetric to the inclination of the other side of hard ring. In this embodiment, the axial displacement due to the thermal expansion being bigger than that of previous embodiment, that the amount of final tightening of nut becomes bigger.

As obvious from the foregoing description, the roll assembly according to the present invention can provide meritorious features such, for example, that:

a. The hard ring can be effectively and strongly compressed axially and radially into secure mounting on the roll body. b. Since there is no gap between the inner peripheral surface of the hard ring and the outer peripheral surface of the roll body, the resistant strength to rolling load can be increased.

What is claimed is:

1. A roll assembly comprising in combination:
A. a roll body having an abutting means;
B. a hard ring securely fitted around the outer peripheral surface of said roll body in such a manner that one end face of the hard ring is abutted against said abutting means, the other end face of said hard ring being a conical surface diverging toward said abutting means;
C. a clamp ring provided on the outer peripheral surface of said roll body adjacent said hard ring, the right having a conical surface corresponding to said conical surface of said hard ring, the inner diameter of the clamp ring being substantially greater than the diameter of said outer peripheral surface of said roll body over which it is positioned; and
D. tightening means pressing said clamp ring and said hard ring toward said abutting means so as to tighten said rings between said tightening means and abutting means;
E. said assembly being assembled in such a manner that, first, said clamp ring positioned between said tightening means and hard ring is heated so that the diameter and axial length thereof is increased and, then, while heated further pressed axially toward said hard ring by means of said tightening means.

2. The roll assembly according to claim 1, wherein said abutting means is formed as a flange integral with said roll body.

3. The roll assembly according to claim 2, wherein said flange has a conical surface engaging with a corresponding conical surface defined on said one end face of said hard ring, said corresponding conical surface diverging toward said other end face of said hard ring.

4. The roll assembly according to claim 1, wherein said abutting means consist of a second tightening means and a second clamp ring having a conical surface engaging with a corresponding conical surface provided on said one end face of said hard ring diverging toward said other end of the same and said assembly is assembled in such a manner that first and second clamp rings positioned between said first tightening means and hard ring and said second tightening means and hard ring, respectively, are heated so that the diameter and axial length thereof are increased and, then, are tightened between said hard ring and first tightening means, and said hard ring and second tightening means, respectively, by means of said tightening means.

5. The roller assembly according to claim 4, wherein said second tightening means is formed as a flange integral with said roll body.

* * * * *